United States Patent
Jones et al.

(10) Patent No.: US 6,518,520 B2
(45) Date of Patent: *Feb. 11, 2003

(54) APPARATUS AND METHOD FOR WEIGHING THE OCCUPANT OF A BED

(75) Inventors: David Lane Jones, Houston, TX (US); John Frederick Jones, Houston, TX (US)

(73) Assignee: Mobility Innovations, Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/538,459

(22) Filed: Mar. 30, 2000

(65) Prior Publication Data
US 2002/0046886 A1 Apr. 25, 2002

(51) Int. Cl.⁷ ............................ G01G 19/52; G01G 5/04
(52) U.S. Cl. ........................ 177/144; 177/208; 177/254
(58) Field of Search ................................ 177/136, 144, 177/208, 209, 254; 73/862.581, 862.582; 5/620, 627

(56) References Cited

U.S. PATENT DOCUMENTS

| | | | | |
|---|---|---|---|---|
| 3,217,818 A | * | 11/1965 | Engelsher et al. | 177/208 |
| 3,338,323 A | * | 8/1967 | Swersey | 177/254 |
| 3,955,637 A | | 5/1976 | Del Rosso | 177/145 |
| 4,210,216 A | * | 7/1980 | Godden | 177/134 |
| 4,628,186 A | * | 12/1986 | Bergemann et al. | 177/245 |
| 4,666,005 A | * | 5/1987 | Komoto et al. | 177/180 |
| 4,951,763 A | | 8/1990 | Zimmerman et al. | 177/164 |
| 5,276,432 A | * | 1/1994 | Travis | 177/144 |
| 5,434,366 A | | 7/1995 | Troisi | 177/52 |
| 5,606,516 A | * | 2/1997 | Douglas et al. | 177/208 |
| 5,861,582 A | | 1/1999 | Flanagan | 177/144 |
| 5,906,016 A | * | 5/1999 | Ferrand et al. | 177/144 |
| 5,984,349 A | * | 11/1999 | Van Voorhies | 177/144 |
| 5,984,649 A | | 11/1999 | Van Voorhies | 280/735 |
| 6,089,106 A | * | 7/2000 | Patel et al. | 73/862.582 |
| 6,101,436 A | * | 8/2000 | Fortune et al. | 177/144 |
| 6,180,893 B1 | * | 1/2001 | Saigo | 177/144 |

\* cited by examiner

*Primary Examiner*—Randy W. Gibson
(74) *Attorney, Agent, or Firm*—Haynes and Boone, LLP; John W. Montgomery (57) ABSTRACT

Weighing apparatus preferably comprises at least two weight sensing elements that are connected to each other by at least one communication cable. In accordance with this invention, weight sensing elements are preferably positioned either adjacent to or at each end of bed in order to support bed. In a preferred embodiment, each weight sensing element comprises a weight sensing base and at least a pair of mounting assemblies that may be at or adjacent to the head and foot of bed. Preferably, weight sensing base extends laterally and mounting assemblies extend vertically. Each weight sensing base is supported by the corresponding pair of mounting assemblies. In addition, a power cord is used for transferring electrical power to weighing apparatus. A pendant assembly is used for operating weighing apparatus. A pendant cord connects hand-held pendant to both weight sensing elements upon being plugged into either weight sensing element. The method of operation of weighing apparatus is based on a two-mode operation: TARE mode operation and WEIGH mode operation. The principals of operation of weighing apparatus are a summation of load points that are established when bed, under its own controls, is lowered to a position that allows bed and its contents to rest on weighing apparatus.

15 Claims, 6 Drawing Sheets

APPARATUS AND METHOD FOR WEIGHING THE OCCUPANT OF A BED

FIELD OF THE INVENTION

This invention relates generally to an apparatus for and a method of weighing an occupant of a bed and in particular to such apparatus and method for weighing a bedridden patient.

BACKGROUND OF THE INVENTION

Doctors like to monitor the weight gain or loss of patients under their care. Generally, this is no problem for most patients, but for those who are bedridden or find it difficult to get into and out of bed, it can create a stressful event for the patient when his weight must be taken frequently each day to monitor weight loss or weight gain.

In addition, living things and objects which are individually held or supported by any object or device may need to be weighed individually. Removing the living things and objects from the corresponding holding or supporting object or device and returning the living things and objects back to their original container and position may be a cumbersome task that may need to be repeated numerous times.

SUMMARY OF THE INVENTION

Weighing apparatus enables any hospital bed to be converted to a scale. Weighing apparatus preferably comprises at least two weight sensing elements that are connected to each other by at least one communication cable. In accordance with this invention, weight sensing elements are preferably positioned either adjacent to or at each end of bed in order to support bed. In a preferred embodiment, each weight sensing element comprises a weight sensing base and at least a pair of mounting assemblies that may be at or adjacent to the head and foot of bed. Preferably, weight sensing base extends laterally and mounting assemblies extend vertically. Each weight sensing base is supported by the corresponding pair of mounting assemblies. In addition, a power cord is used for transferring electrical power to weighing apparatus. A pendant assembly is used for operating weighing apparatus. A pendant cord connects handheld pendant to weight sensing elements upon being plugged into either weight sensing element. The method of operation of weighing apparatus is based on a two-mode operation: TARE mode operation and WEIGH mode operation. The principals of operation of weighing apparatus are a summation of load points that are established when bed, under its own controls, is lowered to a position that allows bed and its contents to rest on weighing apparatus.

It is an object and feature of this invention to provide an apparatus for and a method of weighing a living thing or object resting on a bed or on any other holding device.

Another object of this invention is to enable weighing a living thing or an object frequently or regularly without having to move the living thing or object out of bed or of any other holding device and onto scales.

A further object and feature of this invention is that the weight of a living thing or an object in a bed or in any other holding device can be measured regardless of the position of the living thing or object on the bed or in any other holding device.

These and other objects, advantages and features of this invention will be apparent to those skilled in the art from a consideration of this specification including the attached drawings and appended claims.

BRIEF DESCRIPTION OF THE DRAWINGS

Some, referred embodiments of the invention will be described in detail below with reference to the following drawings.

DESCRIPTION OF THE PREFERRED EMBODIMENTS

The present invention is a weighing apparatus 1 that can be used to weigh almost anything but will be described here as used on a bed 3, such as shown in FIGS. 1–12. (The term "bed" is used herein to include, but not be limited to, any health care bed or any other device or object for individually holding or supporting someone and/or something.) Each bed 3 has a frame 5 and legs 6 that are connected to or extend from frame 5. As long as weighing apparatus 1 is connected to bed 3 and is positioned between the floor and frame 5 of bed 3, there is no limitation to position of weighing apparatus 1. Preferably, weighing apparatus 1 is positioned in areas at or adjacent to head and foot of bed 3. Bed 3 has mechanisms to raise and lower bed 3 to engage and disengage weighing apparatus 1. To engage weighing apparatus 1, bed 3 is lowered to a position that allows the entire bed and its contents to rest on weighing apparatus 1, thus turning the entire bed into a weighing platform.

Figure 3:
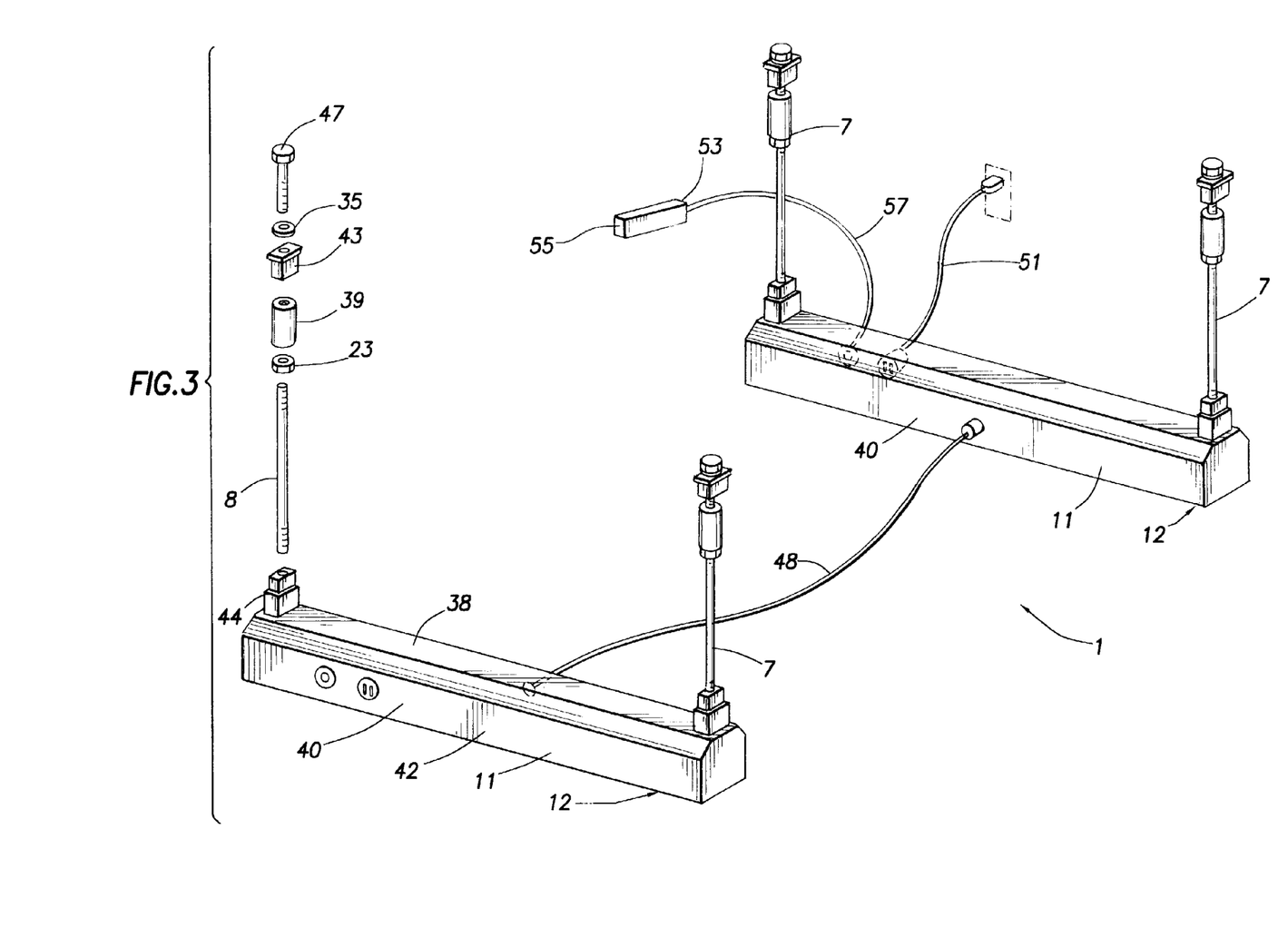
FIG. 3 is a partly exploded view of a weighing apparatus.
Figure 4:
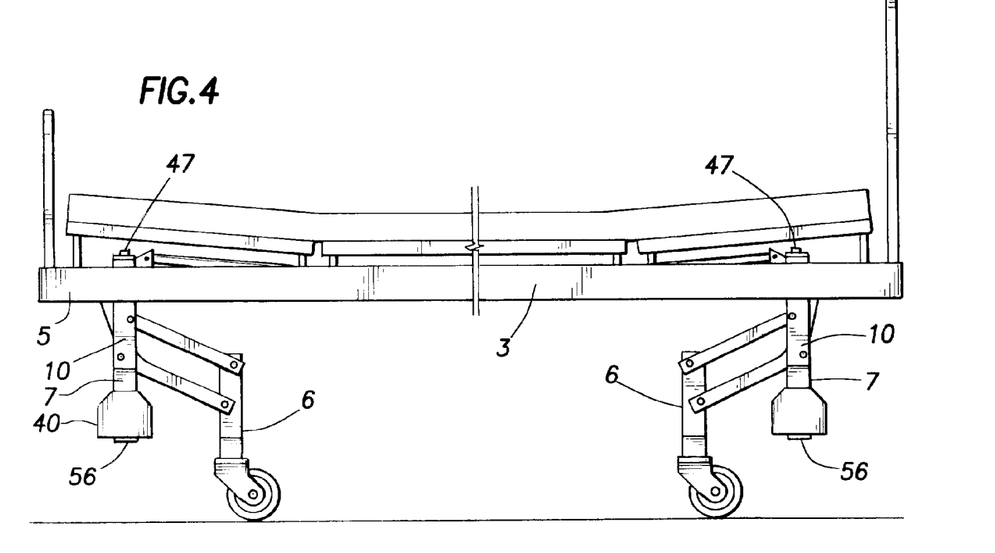
FIG. 4 is a view partly in section and partly in elevation of a bed with legs that is equipped with a weighing apparatus, said weighing apparatus comprising two weight sensing elements used for measuring the weight of the bed.
Figure 5:
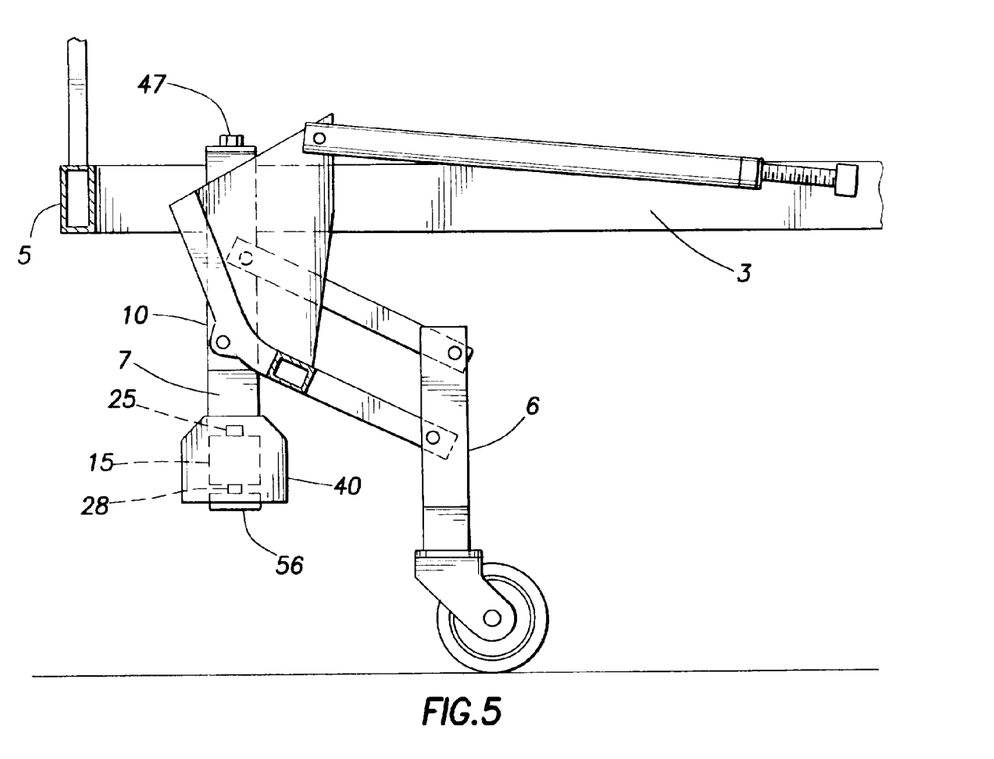
FIG. 5 is a vertical sectional view of the bed of FIG. 4, with the weight sensing element being elevated, but with the leg not being elevated.
Figure 6:
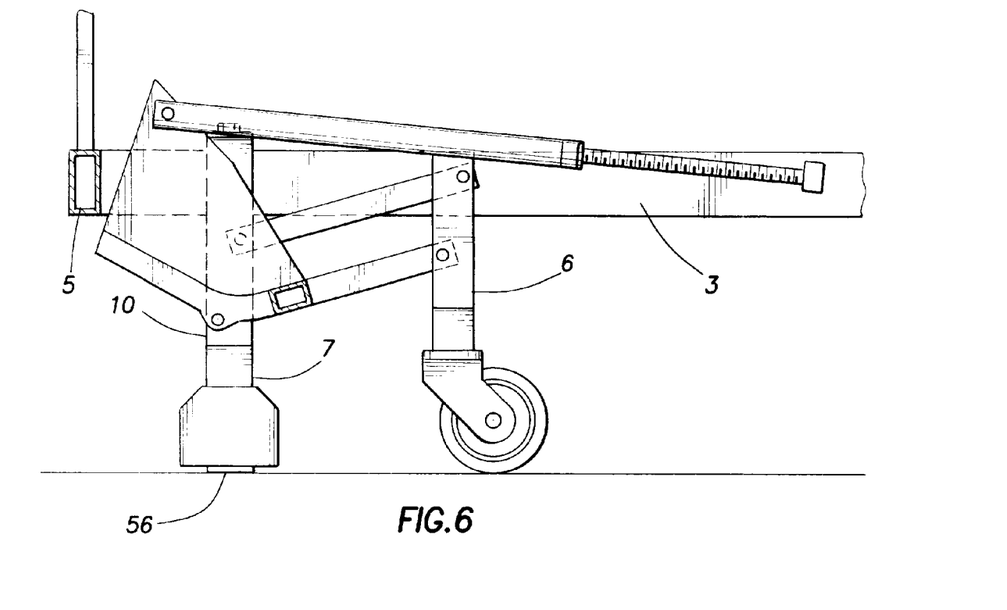
FIG. 6 is a version of FIG. 5, with neither the weight sensing element nor the leg being elevated.
Figure 7:
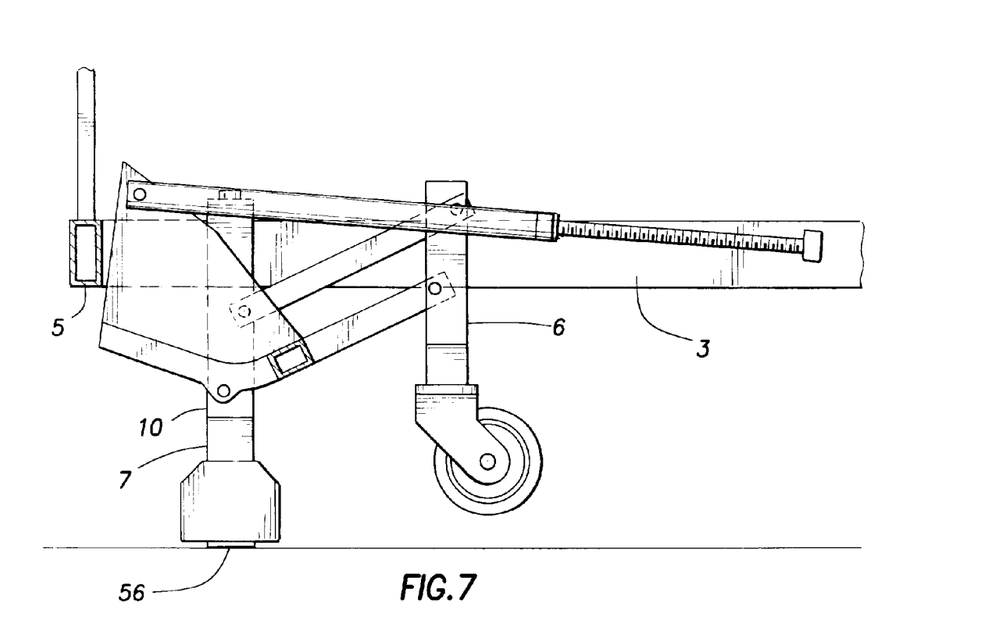
FIG. 7 is a version of FIG. 6, with the leg being elevated, but with the weight sensing element not being elevated.
Figure 8:
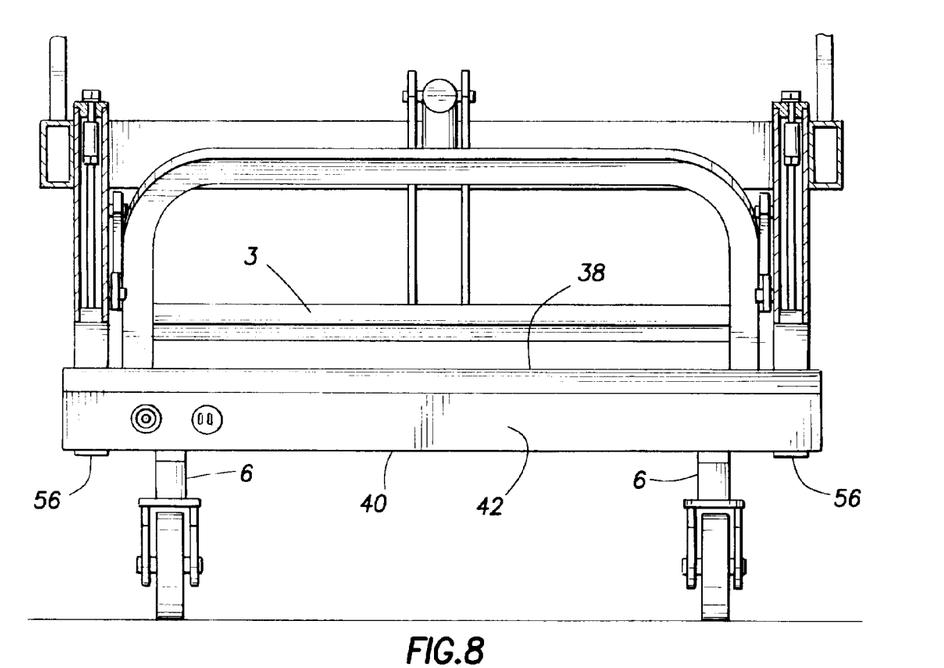
FIG. 8 is a lateral side view, partly in section, of a section of the bed of FIG. 4.

Weighing apparatus 1 preferably comprises at least two weight sensing elements 12 (as shown in FIG. 3) that are connected to each other by at least one communication cable 48. In accordance with this invention, weight sensing elements 12 are preferably positioned either adjacent to or at each end of bed 3 in order to support bed 3. In a preferred embodiment, each weight sensing element 12 comprises a weight sensing base 11 and at least a pair of mounting assemblies 7 that may be at or adjacent to the head and foot of bed 3 (as shown in FIGS. 3 and 4). Preferably, weight sensing base 11 extends laterally and mounting assemblies 7 extend vertically. Each weight sensing base 11 is supported by the corresponding pair of mounting assemblies 7. Each communication cable 48 connects a pair of weight sensing bases 11 to one another.

Figure 1:
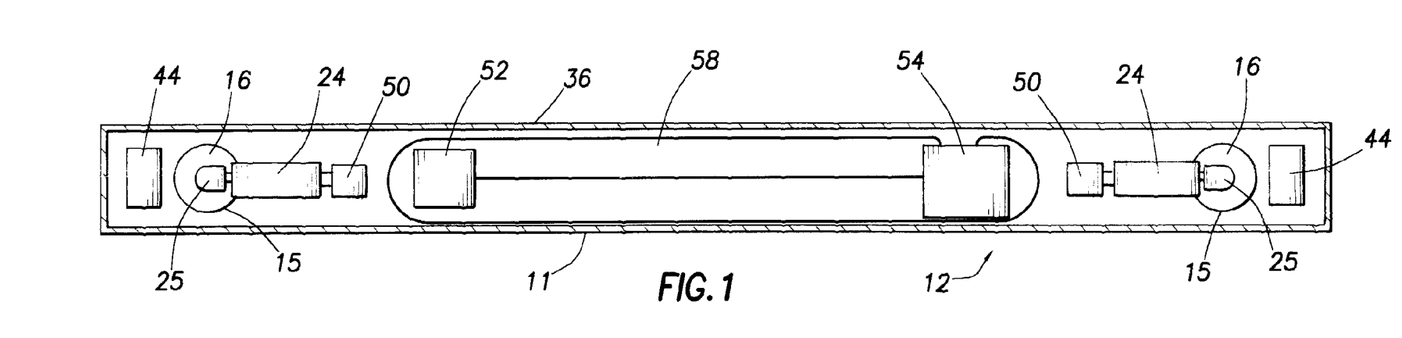
FIG. 1 is a top sectional view of a weight sensing element of a weighing apparatus.
Figure 2:
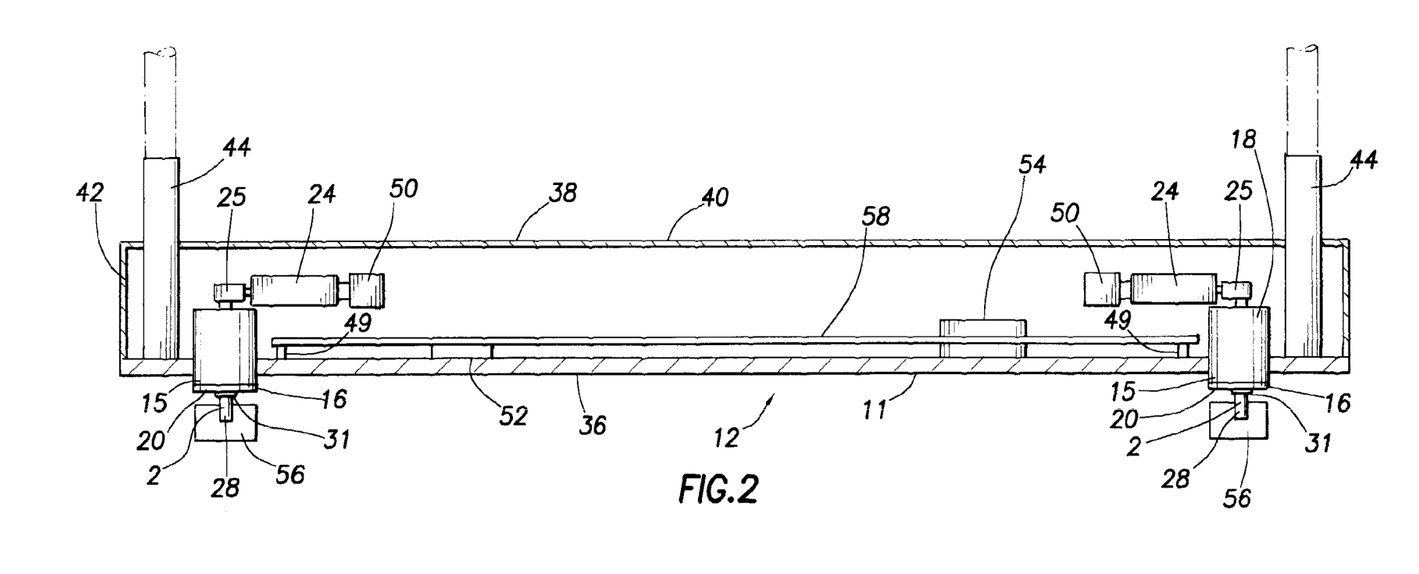
FIG. 2 is a side sectional view of the weight sensing element of FIG. 1.

One weight sensing element 12 is shown in more detail in FIGS. 1 and 2, with weight sensing base 11 being shown in more detail. Weight sensing base 11 comprises a housing cover 40, a horizontal bar 36, a pair of weight sensing instruments 18, a thermostat 52, a heat tape 58 and a transformer 54. Each weight sensing instrument 18 comprises a foot 56, a fluid-filled instrument 16, a transducer 24 and a signal conditioner 50. Fluid-filled instrument 16 extends downward from inside housing cover 40. In a preferred embodiment, fluid-filled instrument 16 comprises a housing 15, a fitting 25, a flexible diaphragm 20, a bolt 28 having a head 19 (not shown) and a body 2 that extends downwardly from head 19, a nut 31 and a pair of washers 32, 34 (not shown). Housing 15 resembles an inverted cup and per se has an open bottom and a top opening before being assembled, such that after assemblage, top opening is covered by fitting 25 connecting housing 15 to transducer 24. Flexible diaphragm 20 is a force-sensing disc having a central hole. Flexible diaphragm 20 preferably consists of canvas or re-enforced rubber. Flexible diaphragm 20 extends across open bottom of and is attached to bottom of housing 15, such that when head 19 of bolt 28 is inserted through central hole of and rests above flexible diaphragm 20, housing 15 is completely sealed off at its bottom. In a preferred embodiment, before head 19 of bolt 28 is pushed through central hole of flexible diaphragm 20, body 2 of bolt 28 is inserted through first washer 32 which is moved upwards to rest against head 19 of bolt 28. Then, bolt 28 is pushed upwards via central hole of flexible diaphragm 20, such that first washer 32 is positioned tightly between flexible diaphragm 20 and head 19 of bolt 28. Then, second washer 34 is moved along body 2 of bolt 28, such that second washer 34 is positioned under and against flexible diaphragm 20. As a result, pair of washers 32, 34 sandwich a portion of flexible diaphragm 20 that extends along pair of washers 32, 34. Nut 31 is then twisted upwards around body 2 of bolt 28 until nut 31 rests under and against second washer 34 and securely holds second washer 34, such that any movements of flexible diaphragm 20 will not result in any change in the position of pair of washers 32, 34. Bolt 28 is then mounted from above onto foot 56, with a lower section of bolt 28 resting stably in foot 56, a middle section of bolt 28 extending between foot 56 and housing 15 of fluid-filled instrument 16 and an upper section of bolt 28 extending inside housing 15 of fluid-filled instrument 16. Foot 56 preferably comprises solid plastic including, but not limited to, Delron. Flexibility of flexible diaphragm 20 does not allow side loading and, thus, enables accurate transmittal of the weight force imposed. Flexible diaphragm 20 may be designed to support any chosen amount of weight. In this preferred embodiment, flexible diaphragm 20 may be designed to support approximately 750 to 1000 pounds. Fitting 25 fits upon housing 15 and connects housing 15 to transducer 24. Thus, fitting 25 forms a path between housing 15 and transducer 24. Any air existing in housing 15, fitting 25 and transducer 24 is extracted, preferably by a vacuum pump, and fluid is then poured in to replace the extracted air until housing 15, fitting 25 and transducer 24 are absolutely full of fluid. Then, transducer 24 is sealed on its end that is farthest from fitting 25. Transducer 24 preferably comprises stainless steel. Housing 15 preferably comprises heat-treated aluminum or stainless steel. In a preferred embodiment, fitting 25 comprises brass or stainless steel. Standard electronic wiring is used to connect transducer 24 to signal conditioner 50.

The mechanics of fluid-filled instrument 16 are hydraulic. A fluid is contained above flexible diaphragm 20 in housing 15 of fluid-filled instrument 16. A fluid used in fluid-filled instrument 16 is instrument oil. In a preferred embodiment, two fluid-filled instruments 16 are mounted on horizontal bar 36 of about 6 inches wide. Horizontal bar 36 is enclosed and insulated and, thus, is a unit. The length of horizontal bar 36 is dictated by dimensions and type of bed 3. Housing cover 40 extends above and covers each horizontal bar 36. Housing cover 40 has a top surface 38 and side surfaces 42. Either housing cover 40 or horizontal bar 36 or both must have a number of leading edges that extend along a portion of surface of horizontal bar 36 or housing cover 40 or both, respectively, to allow connecting housing cover 40 to horizontal bar 36 by using connecting means. Housing cover 40 is three-dimensional and, when placed upon horizontal bar 36, forms in combination with horizontal bar 36 a hollow enclosing body that encloses fitting 25, transducer 24, signal conditioner 50, thermostat 52, heat tape 58, transformer 54 and a portion of housing 15. Heat tape 58 is positioned between each pair of fluid-filled instruments 16. Heat tape 58 preferably extends closer to horizontal bar 36 (than to housing cover 40) and along a central section of horizontal bar 36. Position of heat tape 58 is selected in order to evenly heat all items, parts of items and space that are enclosed by housing cover 40 and that are positioned above horizontal bar 36. In a preferred embodiment, heat tape 58 is positioned upon supports 49 extending upwards from horizontal bar 36, so that heat tape 58 is not in direct contact with and does not damage horizontal bar 36. Transformer 54 for heat tape 58, however, is preferably positioned on and connected to horizontal bar 36. In a preferred embodiment, connecting means (including, but not limited to, screws) may be used to removably connect transformer 54 to horizontal bar 36. Transformer 54 is used to control operation of heat tape 58 and is connected, preferably by electrical wiring, to heat tape 58. Thermostat 52 is preferably connected by electrical wiring to transformer 54. In a preferred embodiment, thermostat 52 is connected by connecting means to horizontal bar 36. Thermostat 52 is individually powered. Location of thermostat 52 is chosen in order to ensure an average reading of temperature of air entrapped between housing cover 40 and horizontal bar 36. However, such locations of components of weight sensing element 12 are not intended to be limiting and are solely representing a preferred embodiment of the invention. Signal conditioner 50 is preferably a Printed Circuit Board (PCB) comprising Central Processing Unit (CPU), Electrically Programmable Read Only Memory (EPROM), Electrically Erasable Programmable Read Only Memory (EEPROM) and Random Access Memory (RAM). Although EPROM holds operating memory, EEPROM is needed for calibration. In addition, a power cord 51 is used for transferring electrical power to weighing apparatus 1. Power cord 51 can be plugged into weight sensing base 11 of either weight sensing element 12.

In a preferred embodiment, a pendant assembly 53 is used for operating weighing apparatus 1. Pendant assembly 53 preferably comprises a hand-held pendant 55 and a pendant cord 57 (as shown in FIG. 3). Pendant cord 57 is plugged into and connects hand-held pendant 55 to weight sensing elements 12. Each signal conditioner 50 communicates with and transfers data to hand-held pendant 55. Hand-held pendant 55 comprises a pendant screen 59 (not shown), for demonstrating information, and control elements 60 (not shown), for controlling operation of weighing apparatus 1. In addition to digital display on pendant screen 59, there are preferably at least three control elements 60 on pendant screen 59 of pendant assembly 53. At least one control element 60 (referred to hereafter as ENTER control element) is used for selection and entrance of information. Some control elements 60 (referred to hereafter as SOFT control elements) may be used to serve various functions. Some SOFT control elements 60 may each serve different functions at different times and under different conditions. Each signal conditioner 50 is poled by pendant assembly 53 for data used for determining weight of patient.

Figure 9:
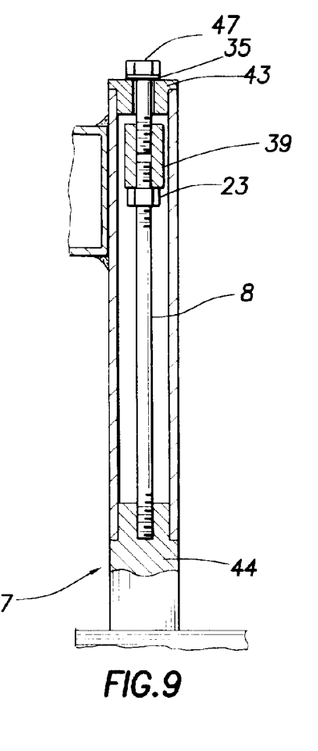
FIG. 9 is a sectional view of a mounting assembly of FIG. 4.

Mounting assembly 7 is used to connect weight sensing element 12 to frame 5 of bed 3 (FIG. 11) or to leg 6 of bed 3 (FIGS. 4, 5, 6 and 7). In a preferred embodiment, each mounting assembly 7 comprises a mounting base 44, a threaded pole 8, a mounting nut 23, a nut-bushing 39, an end cap 43, a mounting washer 35 and a mounting bolt 47. Such a preferred embodiment of mounting assembly 7 may be mounted into and via a tubing 10, that is a component of leg 6 of bed 3, to frame 5 of bed 3. In another embodiment (not shown), tubing 10 is not a component of leg 6 of bed 3, but is an extension from frame 5 of bed 3 and is not readily separable from frame 5 of bed 3. In yet another preferred embodiment, mounting assembly 7 comprises in addition a tube 9 that is neither a component of leg 6 nor an extension from frame 5 of bed 3 and is readily removable from bed 3 (refer to FIG. 11). Tube 9 is removably connected, independent of leg 6 of bed 3, to frame 5 of bed 3. Tube 9, tubing 10 or any other such three-dimensional, hollow body (with open top and open bottom) is used to laterally surround connected components of mounting assembly 7 in order to minimize displacement and movement of connected components of mounting assembly 7. In either embodiment, mounting base 44 extends upwardly from and above weight sensing base 11, preferably from horizontal bar 36 through and above housing cover 40. Threaded pole 8 has a threaded bottom portion and a threaded top portion. Threaded pole 8 is stably mounted onto and upon mounting base 44, with bottom portion of threaded pole 8 fitting tightly in a threaded tubular passage in uppermost section of mounting base 44. Mounting nut 23 and nut-bushing 39, which preferably are both threaded on their inner surface, are twisted in order around threaded top portion of threaded pole 8. End cap 43, having a downwardly extending open passage, and mounting washer 35 are in order placed above nut-bushing 39. Tubular lower body of mounting bolt 47 is inserted in order through mounting washer 35, end cap 43 and part of nut-bushing 39 until bottom of mounting bolt 47 rests close to and above top portion of threaded pole 8 (as shown in FIG. 9). A bottom portion of tubular lower body of mounting bolt 47 is inserted into nut-bushing 39 until mounting bolt 47 rests securely in nut-bushing 39. It should be emphasized that this version of mounting assembly 7 is only a preferred embodiment and is not intended to cause any limitations on structure of mounting assembly 7. Assemblage of mounting assembly 7 may vary slightly depending upon the type of hollow body that is used to surround the connected components of mounting assembly 7. If tubing 10 is used (as a component of leg 6 of bed 3, as shown in FIG. 4), it may be preferable to upwardly insert connected components of mounting assembly 7 into tubing 10 after nut-bushing 39 is twisted around threaded top portion of threaded pole 8. Then, mounting washer 35 and end cap 43 are moved upwards along tubular lower body of mounting bolt 47 until they reach and rest against and below head of mounting bolt 47. At this stage, mounting bolt 47, along with upper mounting washer 35 and end cap 43, is placed onto tubing 10, such that head of mounting bolt 47, mounting washer 35 and upper section of end cap 43 are positioned above tubing 10. Upper section of end cap 43 is at least of a sufficiently large surface area to be able to rest stably upon tubing 10. Meanwhile, upper section of end cap 43 has a hole that is large enough to allow insertion of tubular lower body of mounting bolt 47 therethrough, but small enough to prevent passage of mounting washer 3 5 and head of mounting bolt 47 therethrough. Mounting bolt 47 is then twisted downwards until bottom of mounting bolt 47 rests close to top of threaded pole 8 and mounting assembly 7 tightly holds weighing apparatus 1 in place and as an addendum to leg 6 of bed 3. If another tubing 10 that is not part of leg 6, but is part of frame 5, of bed 3 is used, the above set-up is used, except that weighing apparatus 1, instead of being an addendum to leg 6 of bed 3, serves as an addendum to frame 5 of bed 3.

Figure 11:
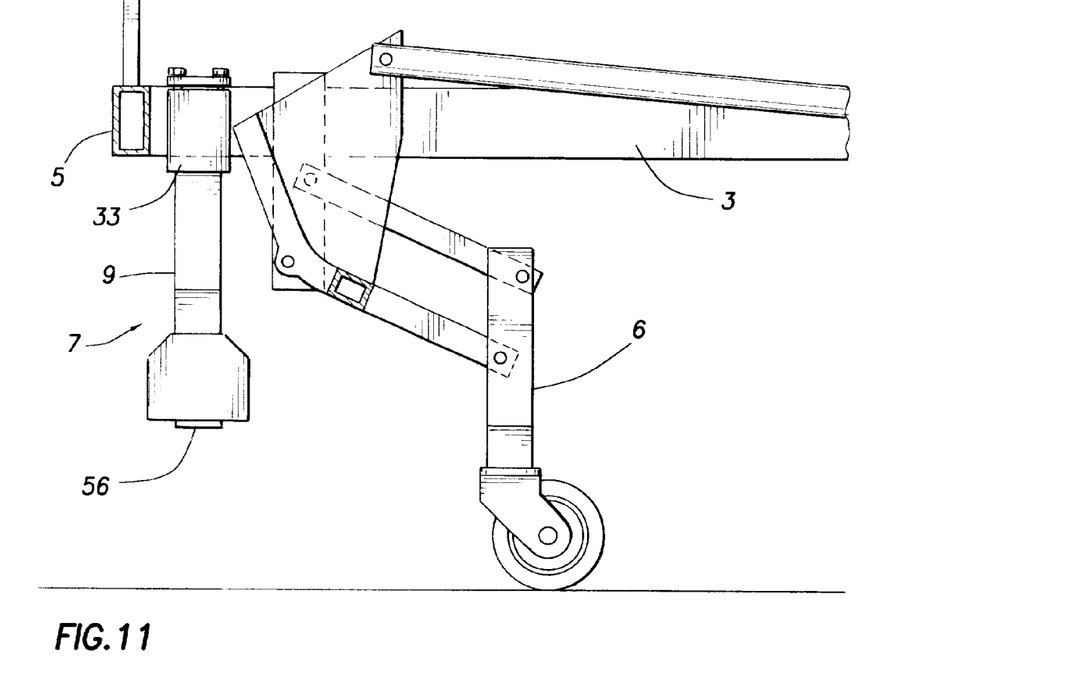
FIG. 11 is a view partly in section and partly in elevation of a section of a bed with a leg and a weight sensing element that is not connected to the leg of the bed.
Figure 12:
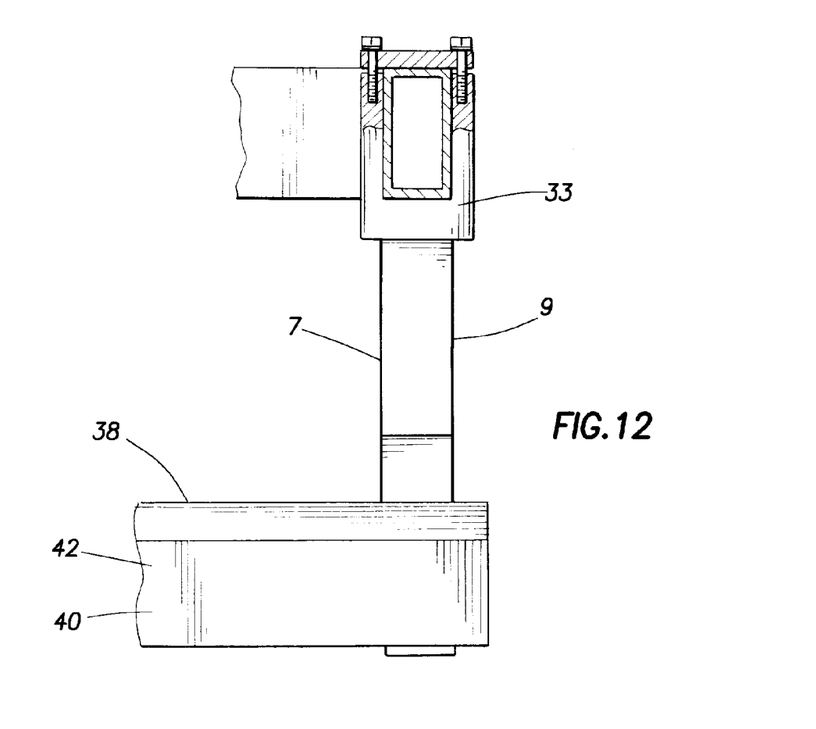
FIG. 12 is a view partly in section of a section of a bed with a frame and a weight sensing element that is connected to the frame of the bed.

If tube 9, which is not a component of bed 3, is used (as shown in FIG. 11), tube 9 may surround connected components of mounting assembly 7 either from manufacturing stage or before mounting assembly 7 comes into contact with bed 3. Numerous variations of tube 9 may be produced, depending on manner of mounting of mounting assembly 7 onto frame 5 of bed 3. Tube 9 may extend upwards into a mounting bracket 33 which may have various forms. If frame 5 of bed 3 has a bottom portion at head or foot of bed 3 that allows sliding of a hollow body (that is slightly larger than the bottom portion) along the bottom portion, an embodiment of mounting bracket 33 that has a shape which matches shape of that bottom portion of frame 5 is used (as shown in FIG. 12). Holes on the bottom portion of hollow body allow quick and simple attachment of mounting bracket 33 to frame 5 of bed 3. If structure of frame 5 does not allow sliding of mounting bracket 33 along bottom portion of frame 5, mounting bracket 33 may be U-shaped. In such an embodiment, holes may exist on vertical sides of mounting bracket 33, said vertical sides being positioned next to opposite vertical sides of a section of frame 5. Thus, upon placing a separate inverted U-shaped bracket upon same section of frame 5 of bed 3 whereat the U-shaped mounting bracket 33 is positioned, vertical sides (having holes) of the separate inverted U-shaped bracket rest along and parallel to and may be connected to corresponding vertical sides of the U-shaped mounting bracket 33 when holes of adjacent surfaces are aligned.

Although some other embodiments may not be presently preferred, such embodiments are not being excluded. Even only mounting base 44 and mounting bolt 47 (if of needed dimensions) may be used together, without any other components, to connect weighing apparatus 1 to frame 5 of bed 3. As is clearly demonstrated, weighing apparatus 1 may be connected to frame 5 or leg 6 of bed 3 in numerous ways, as long as some component(s) of mounting assembly 7 is (are) in some way connected to frame 5 or leg 6 of bed 3.

Figure 10:
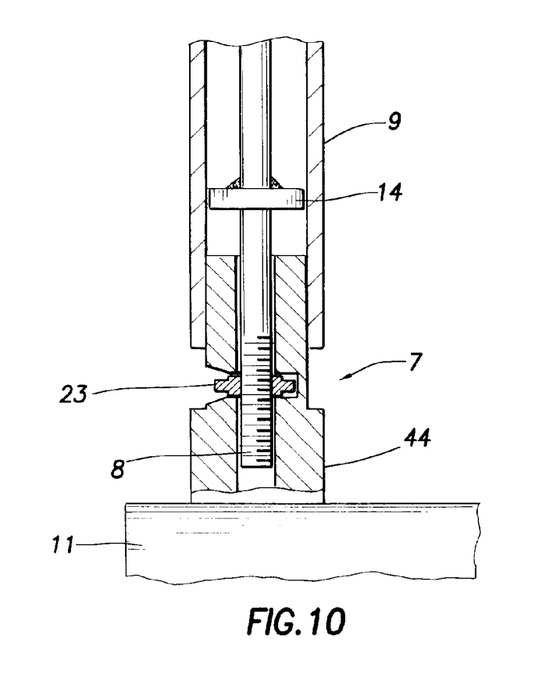
FIG. 10 is a sectional view of a lower section of a mounting assembly.

In addition, mounting assembly 7 may be designed in a way to allow leveling of weight sensing base 11 in order to avoid inaccuracies and inefficiency in weight measurements. As shown in FIG. 10, a mounting nut 23 may be used to enable separate adjustment of each mounting assembly 7 to ensure that weight sensing base 11 is leveled and that load is transferred evenly to all weight sensing instruments 18 of all weighing apparatus 1. In such an embodiment, a side opening exists in body of mounting base 44 at a location wherein mounting nut 23 is positioned. In order to make mounting nut 23 reachable, side opening is large enough to enable contacting and turning mounting nut 23 in order to allow upward and downward movements of threaded pole 8. Upward and downward movements of each threaded pole 8 allow desired changes in height of each mounting assembly 7 and, thus, allow leveling of weight sensing base 11. Threaded pole 8 may include a disc 14 which fits against walls of tube 9 to prevent any side movements of threaded pole 8.

The method of operation of weighing apparatus 1 is based on a two-mode operation: TARE mode operation (i.e., operation for measuring TARE weight) and WEIGH mode operation (i.e., operation for measuring total weight). TARE weight is that data that is subtracted from the total weight so that only the patient weight is reflected. Zeroing is setting the TARE weight without the patient in bed 3. When the total weight and the TARE weight are the same, the displayed weight is zero. Adjusting is manipulating of the TARE weight manually. Adjusting allows for adding or removing items, such as accessories ( including blankets, pillows, etc.), and still displaying only the patient's weight. Upon initial installation of weighing apparatus 1 to bed 3, and before lowering bed 3 onto weighing apparatus 1, depressing some SOFT control elements 60 results in the displayed weight to be zero on pendant screen 59. Before lowering bed 3 onto weighing apparatus 1, at least one SOFT control element 60 is depressed, causing weighing apparatus 1 to enter TARE mode operation. It should be ensured that all accessories are on bed 3 when the TARE weight is zeroed. The display will instruct the operator to lower bed 3. When weighing apparatus 1 is engaged and bed 3 is resting solely on weighing apparatus 1, the electronics will in a short time and automatically take the total weight present and store that value in the TARE register. This will result in a display of 0.0 pound. To weigh a patient resting on bed 3, one SOFT control element 60 is used to select WEIGH mode operation. On pendant screen 59, instructions are displayed that include raising of bed 3 (if bed 3 is resting on weighing apparatus 1) or lowering of bed 3 (if bed 3 is not resting on weighing apparatus 1). When weighing apparatus 1 is engaged and bed 3 is resting solely on weighing apparatus 1, automatically and electronically and in a short time, the total weight is taken, the TARE weight is subtracted from the total weight to obtain the patient's weight and the patient's weight is displayed on pendant screen 59. Anytime any accessories are to be added or removed from bed 3, some SOFT control element 60 should be enacted to select an ADJUST mode (freezing the weight of the patient on pendant screen 59 and entering TARE mode operation). The accessories should be added to or subtracted from bed 3. Pendant screen 59 instructs the operator to raise bed 3 if bed 3 is resting on weighing apparatus 1 or to lower bed 3 if bed 3 is already in raised position. When weighing apparatus 1 is engaged and bed is resting solely on weighing apparatus 1, the electronics will in a short time and automatically take the total weight, subtract the TARE weight and display the new weight of patient and accessories that were added or removed. SOFT control elements 60 now play an "ADD" and "SUBTRACT" function. The weight of the accessories is added or subtracted from the stored TARE weight of bed 3 and accessories until previous patient weight is displayed. Then, the operator depresses ENTIR control element 60 to indicate completion of correction and exit the ADJUST mode. The new TARE weight is stored in the TARE memory register. The stored TARE weight in the TARE register is used as the reference value to be subtracted from the summed value of weight sensing elements 12 each time bed 3 is lowered onto weighing apparatus 1. If the patient is already in bed 3 upon installation of weighing apparatus 1 and, thus, zeroing is not possible, then enter the ADJUST mode and adjust the displayed value to reflect the patient's weight that is recorded on the patient's chart.

Flexible diaphragm 20 eliminates side loading and transmits the weight force imposed on weight sensing element 12 by bed 3 to the fluid which becomes pounds per square inch gauge (PSIG) in fluid-filled instrument 16. Transducers 24 convert the imposed pressure to electrical signals, usually 2 millivolts per volt. Each transducer 24 is attached to each corresponding load point within weight sensing base 11. The electrical signals from transducer 24 are conditioned (amplified, modulated, etc.) by signal conditioner 50. Digital signals as raw data are converted to pounds, as determined in factory calibration stage. Each weight sensing instrument 18 has its own signal conditioner 50 comprising Central Processing Unit (CPU), Electrically Programmable Read Only Memory (EPROM), Electrically Erasable Programmable Read Only Memory (EEPROM) and Random Access Memory (RAM, i.e. flash memory). Running its own program, each weight sensing instrument 18 conditions the signals from transducer 24, converts the analog signal to digital information, monitors the temperature in weight sensing base 11 to allow compensation and apply calibration data to render actual weight reading. In addition, each weight sensing instrument 18 has its own individual identification number to allow reporting distinctively to pendant assembly 53, such that pendant assembly 53 distinguishes which weight sensing instrument 18 is reporting at anytime. Such information will be: current weight, current temperature, calibration constants, software version and status such as mode and error.

Upon power up, each weight sensing instrument 18 will report to User Interface of pendant assembly 53 for poling protocol on the communication network. From that point the program in User Interface will pole each of the weight sensing instruments 18 for data and run a control portion of the software to display, instruct and otherwise interface with the operator. The signals from signal conditioner 50 of each weight sensing instrument 18 are combined to obtain the weight of the patient.

The principals of operation of weighing apparatus 1 are a summation of load points that are established when bed 3, under its own controls, is lowered to a position that allows bed 3 and its contents to rest on weighing apparatus 1. Weighing apparatus 1 is used to convert pounds of force (LBF) to pounds per square inch gauge (PSIG). The ratio of LBF to PSIG is kept constant by flexible diaphragms 20 and its proportions are dictated by internal surface areas of fluid-filled instruments 16. The calibration of fluid-filled instrument 16 is achieved by imbedding the proper number into EPROM to be used as a multiplier of the signal of transducer 24 to represent the amount of LBF applied to fluid-filled instrument 16.

Thus, weighing apparatus 1 essentially comprises pair(s) of mounting assemblies 7 (serving as spaced parallel beams for supporting weighing apparatus 1 above floor) and weight sensing base 11 (serving partly as pressure cylinders that support bed 3 when weighing apparatus 1 rests on floor and also including transducer 24 and signal conditioner 50 serving as an analog to digital converter to convert pressure in each cylinder to a digital quantity and to store digital quantity in memory and being positioned between the spaced parallel beams and the floor, with pressure in the cylinders being proportioned to the weight supported by the parallel beams), so that the pressure in the cylinders is indicative of the weight of bed 3 and digital raw data times multiplier equals weight of patient.

Certain objects are set forth above and made apparent from the foregoing description, drawings and examples. However, since certain changes may be made in the above description, drawings and examples without departing from the scope of the invention, it is intended that all matters contained in the foregoing description, drawings and examples shall be interpreted as illustrative only of the principles of the invention and not in a limiting sense. With respect to the above description and examples then, it is to be realized that any descriptions, drawings and examples deemed readily apparent and obvious to one skilled in the art and all equivalent relationships to those stated in the examples and described in the specification or illustrated in the drawings are intended to be encompassed by the present invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. It is also to be understood that the following claims are intended to cover all of the generic and specific features of the invention herein described, and all statements of the scope of the invention which, as a matter of language, might be said to fall in between.

```
*bed    3
    -frame    5
    -legs     6
    -tubing   10
*weighing apparatus   1
    -at least two weight sensing elements 12
    ·weight sensing base 11
        ··pair of weight sensing instruments 18
            ···fluid-filled instrument 16
                ····flexible diaphragm 20
                ····bolt      28
                    ·····head   19 (not shown)
                    ·····body   2
                ····pair of washers    32, 34 (not shown)
                ····nut       31
                ····fitting   25
                ····housing      15
            ···foot 56
            ···transducer 24
            ···signal conditioner    50
        ··thermostat 52
        ··transformer 54
        ··heat tape 58
            ···supports 49
        ··housing cover     40
            ···top surface    38
            ···side surfaces     42
        ··horizontal bar    36
    ·at least a pair of mounting assemblies 7
        ··mounting base     44
        ··threaded pole     8
            ···disc 14
        ··mounting nut      23
        ··nut-bushing 39
        ··end cap 43
        ··mounting washer       35
        ··mounting bolt         47
        ··tube 9
        ··mounting bracket      33
    -at least one communication cable 48
    -power cord 51
    -pendant assembly    53
        ·hand-held pendant      55
            ··pendant screen    59 (not shown)
            ··control elements  60 (not shown)
        ·pendant cord    57
```

What is claimed is:

1. A weighing apparatus comprising: at least two weight sensing elements that each comprise at least:

a. a weight sensing base comprising at least one fluid-filled instrument and an analog to digital converter;

b. two mounting assemblies supporting and holding each weight sensing base and being connected directly or indirectly to a bed that is being weighed;

c. a thermostat mounted within the weight sensing base;

d. a heat tape mounted within the weight sensing base; and e. a transformer connected to the heat tape and to the thermostat and mounted within the weight sensing base;

such that, when the bed is solely supported by the weight sensing base, any pressure exerted on the fluid-filled instruments is indicative of the weight of the bed and of any objects or living things held or supported by the bed as indicated by the analog to digital converted connected to the fluid-filled instrument.

2. The weighing apparatus of claim 1, wherein each weight sensing base comprises a pair of weight sensing instruments each comprising, in addition to the fluid-filled instrument, at least:

a. a foot supporting from below the fluid-filled instrument;

b. a transducer connected at one end via a fitting to top of the fluid-filled instrument and sealed at another end; and c. a signal conditioner connected to the sealed transducer.

3. The weighing apparatus of claim 2 wherein each fluid-filled instrument comprises:

a. a housing having a bottom and a top opening that is covered by the fitting connecting the housing to the transducer;

b. a flexible diaphragm that is a force-sensing disc having a central hole and that extends across and is attached to the bottom of the housing;

c. a bolt having a head, that is enclosed by the housing, and a body, that extends downwardly from the head into the foot supporting the fluid-filled instrument;

d. a pair of washers, with the first washer being positioned tightly between the flexible diaphragm and the head of the bolt and with the second washer being positioned under and against the flexible diaphragm; and e. a nut that rests under and against the second washer;

such that the bottom of the housing is sealed off when the fluid-filled instrument is being assembled and before the housing, the fitting and the transducer are filled with fluid and before the transducer is sealed.

4. The weighing apparatus of claim 3, wherein each weight sensing base further comprises:

a. a housing cover, with the fluid-filled instrument extending downward from inside the housing cover; and b. a horizontal bar, with the horizontal bar and the housing cover forming a hollow enclosing body that encloses the transducer, the signal conditioner, the fitting and part of the housing.

5. The weighing apparatus of claim 3, wherein the flexible diaphragm comprises canvas or re-enforced rubber, the foot comprises a solid plastic, the fining comprises brass or stainless steel, the transducer comprises stainless steel and the housing comprises heat-treated aluminum or stainless steel.

6. The weighing apparatus of claim 2, wherein standard electronic wiring is used to connect the transducer to the signal conditioner.

7. The weighing apparatus of claim 3, wherein the fluid-filled instrument contains instrument oil.

8. The weighing apparatus of claim 2, wherein the signal conditioner includes a Printed Circuit Board comprising Central Processing Unit, Electrically Programmable Read Only Memory, Electrically Erasable Programmable Read Only Memory and Random Access Memory.

9. The weighing apparatus of claim 1, wherein a power cord is connected to one weight sensing base.

10. The weighing apparatus of claim 1, wherein the weighing apparatus further comprises a pendant assembly that is connected to one weight sensing base and that is used for operating the weighing apparatus.

11. The weighing apparatus of claim 9, wherein the pendant assembly comprises:
   a. a hand-held pendant which receives data from the signal conditioner and which comprises at least a pendant screen used for demonstrating information and received data and control elements used for controlling operation of weighing apparatus; and
   b. a pendant cord that connects the hand-held pendant to the weight sensing element.

12. The weighing apparatus of claim 1, wherein a communication cable connects each pair of weight sensing bases to one another.

13. The weighing apparatus of claim 1, wherein each mounting assembly comprises at least:
   a. a mounting base extending upwardly from and above the weight sensing base;
   b. a threaded pole having a threaded bottom portion and a threaded top portion being stably mounted via its threaded bottom portion onto and upon the mounting base;
   c. a mounting nut having a threaded inner surface and being twisted around threaded top portion of the threaded pole;
   d. a nut-bushing having a threaded inner surface and being twisted around threaded top portion of the threaded pole above the mounting nut;
   e. a tube positioned upon and onto the mounting base;
   f. an end cap, having a downwardly extending open passage, being positioned on top of the tube;
   g. a mounting washer positioned above the end cap; and
   h. a mounting bolt inserted through the mounting washer and the end cap; such that the mounting assemblies stably hold the weight sensing base connected to the bed.

14. An apparatus comprising:
   a first weight sensing element that includes:
      a first base that includes a first fluid-filled instrument and a first analog to digital converter;
      a first pair of mounting assemblies connected to the first base;
   a second weight sensing element connectable to the first weight sensing element and including:
      a second base that includes a second fluid-filled instrument and a second analog to digital converter; and
      a second pair of mounting assemblies connected to the second base; and
   wherein the first and second weight sensing elements are connectable to a bed having a plurality of wheels using the first and second pairs of mounting assemblies, respectively, and wherein the first and second weight sensing elements engage a floor beneath the bed and weigh the bed in response to the plurality of wheels being retracted.

15. An apparatus comprising:
   a plurality of weight sensing elements that each include:
      a base that includes:
         at least one fluid-filled instrument;
         an analog to digital converter;
         a foot for supporting the fluid-filled instrument;
         a fitting connected to the fluid-filled instrument;
         a transducer connected to the fitting; and
         a signal conditioner connected to the transducer;
   wherein the plurality of weight sensing elements are connectable to a bed to allow the bed to be weighed; and
   wherein the base of each of said plurality of weight sensing elements further includes:
      a thermostat;
      a heat tape; and
      a transformer connected to the heat tape and to the thermostat.

* * * * *